Figure 1:

Jan 6, 1931.  V. BAUSCH, JR  1,787,564
PHOTOGRAPHIC FILM AND THE METHOD OF MAKING THE SAME
Filed Oct. 25, 1926   4 Sheets-Sheet 1

Inventor:
VIKTOR BAUSCH Jun.,
by Lotka, Kehlenbeck & Harley
Attorneys:

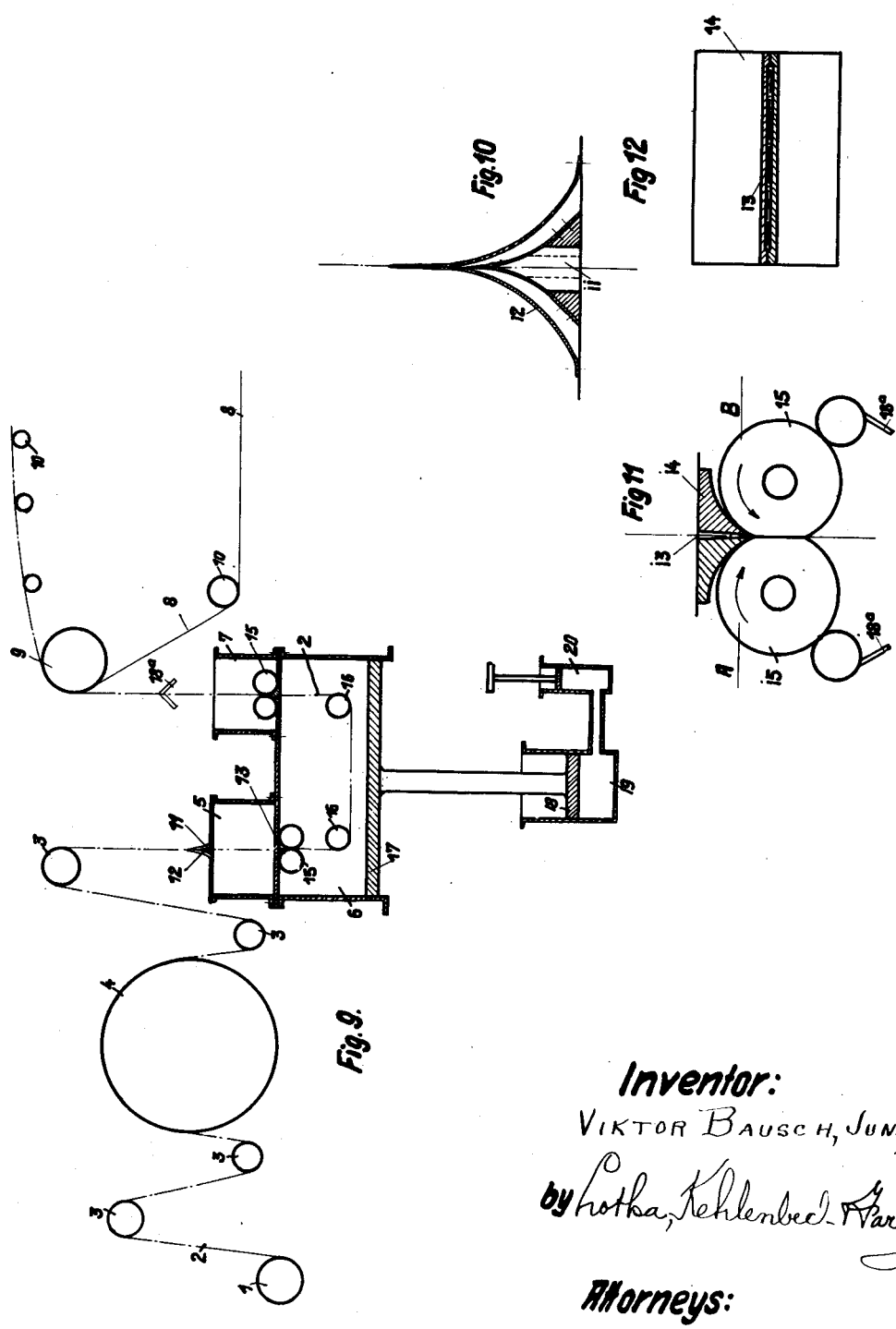

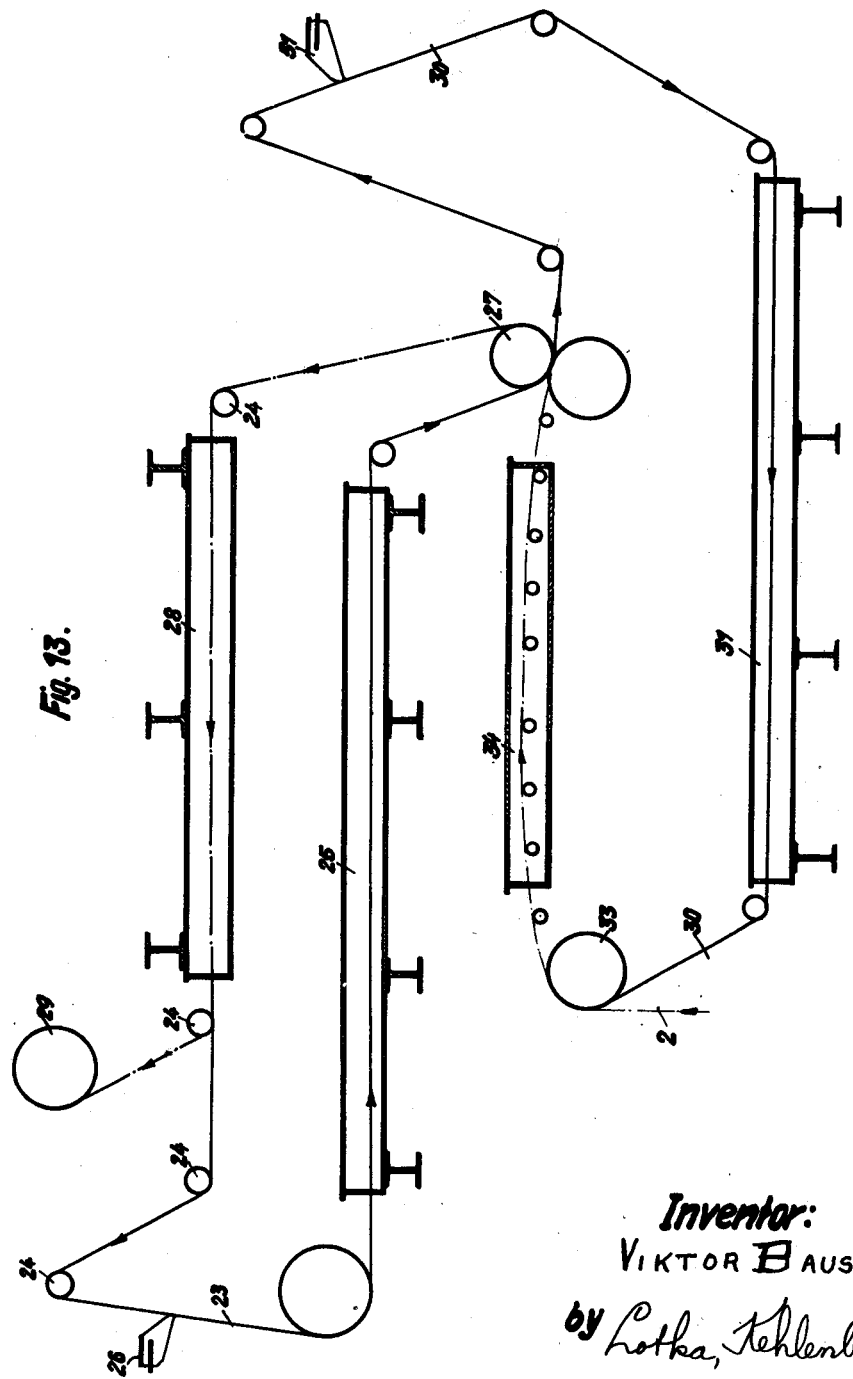

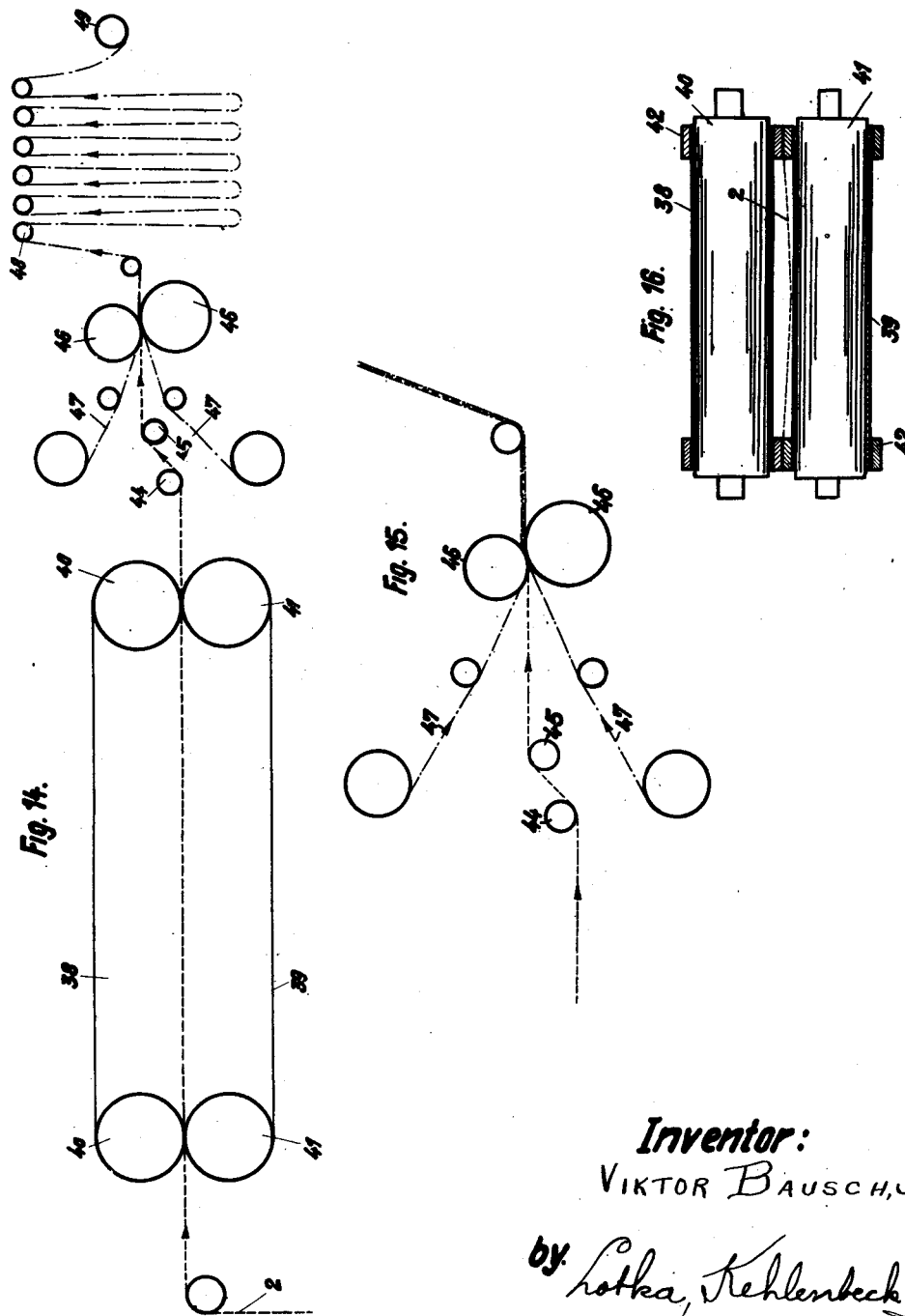

Patented Jan. 6, 1931

1,787,564

UNITED STATES PATENT OFFICE

VIKTOR BAUSCH, JR., OF BERLIN, GERMANY

PHOTOGRAPHIC FILM AND THE METHOD OF MAKING THE SAME

Application filed October 25, 1926, Serial No. 143,990, and in Germany October 26, 1925.

My invention relates to improvements in photographic films and the method of making the same and more particularly to films which are suitable for use in kinematographic and other projection apparatus. One of the objects of the improvements is to provide a film which is fire-proof, and which can be manufactured at low cost. With this object in view my invention consists in providing a film composed of a body of a suitable paper made transparent by means of a suitable transparent impregnating medium such as natural or artificial resin. I have discovered that a paper of high transparency suitable for projection purposes is obtained by filling out the pores of the paper with a medium having an index of refraction as nearly as possible similar to the index of refraction of the fibre of the paper, and in the following description I shall make reference to various impregnating media which, by answering to this condition, provide a film of high transparency. In the manufacture of the transparent film I have found that it is important that the impregnating medium permeates the whole body of the paper, and that for this reason it is necessary to apply the medium from both sides of the paper. When applying the medium from one side of the paper only the opposite side is not sufficiently impregnated with the medium, so that the minute depressions of the surface are not completely filled out, thus causing diffusion of the light rays passing through the paper.

In the preferred form the film consists of a body of paper which has so much of the impregnating medium applied thereto that an additional surface layer of the said medium is provided at both sides of the paper. I have found that thereby the surfaces of the film are made perfectly plane and parallel to each other, which is necessary for an unimpeded passage of the light rays necessary for non-diffuse projection. Further, a film thus prepared is free of minute cavities produced in the interior parts by the drying of the impregnating medium, the parts of the solvent of the impregnating medium escaping when drying the film being replaced with parts of the medium taken from the surface layers. Further, by providing the said surface layers, the hardening of the film by the drying of the impregnating medium is retarded, the said surface layers providing a tight coating retarding evaporation of the solvent and certain softening media added to the impregnating medium. In this respect the property of the outer layers may be improved by properly treating the same, for example by heat, so that the said layers are made sufficiently impermeable to prevent the entire escape of some of the components of the solvent of the impregnating medium and other matter added thereto for softening the film. Therefore the film remains soft and flexible for a considerable length of time even if only a small amount of softening media or no softening media whatever are added to the impregnating medium.

The film may be further improved by adding suitable hardening media to the impregnating medium, which hardening media are likewise dissolved by the solvent. By rapidly heating the surfaces of the film after impregnation thereof the solvent is evaporated mainly on the surfaces of the film, which surfaces are thereby made hard and tight so as to prevent complete evaporation of the solvent within the paper. A film thus prepared has a very hard surface which cannot be spoilt by scratches, and which therefore can be used for a long time.

On the film the picture may be produced either by means of a photographic printing process, or by printing by means of the printing press or by drawing the picture thereon. If it is desired to produce the film by a photographic process a sensitized layer is first applied thereto. For some kinds of impregnating media and their solvents it may be advisable to coat the film with a water-proof cover before applying the sensitized layer. If it is desired to print the picture one side of the film is first coated with an ink absorbing medium.

My invention also relates to the method of impregnating the film. I have found that rapid operation is made possible by first evacuating the film before passing the same through the impregnating medium. Further, I have found that the paper readily imbibes the medium when applying the same under high pressure. The preferred method consists in first evacuating the paper, and thereafter passing the same through the impregnating bath while holding the said bath under high pressure.

Figure 2:
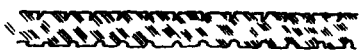
Figure 3:
Figure 4:
Figure 5:
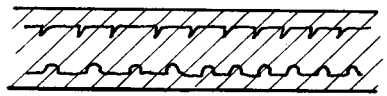
Figure 6:
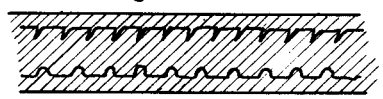
Figure 7:
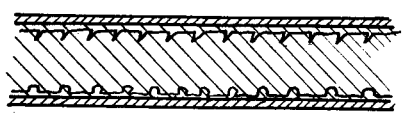
Figure 8:

In order that the invention be more clearly understood several examples embodying the same and apparatus for impregnating the film have been illustrated in the accompanying drawings, in which the same letters of reference have been used in all the views to indicate corresponding parts. In said drawings, Fig. 1, is a sectional elevation on an enlarged scale showing a sheet of paper which has been internally impregnated, while its surfaces are not sufficiently coated with the insulating medium, the figure showing the paper before drying, Fig. 2, shows the same paper after drying, Fig. 3 is a similar sectional elevation showing impregnated paper having thin surface layers at both sides, Fig. 4, shows the same paper after drying, Fig. 5, is a similar sectional elevation showing the impregnated paper having comparatively thick surface layers, Fig. 6, shows the same paper after drying, Fig. 7, is a similar elevation showing a paper similar to the one shown in Fig. 6 and having additional surface layers applied thereto, Fig. 8, is a similar sectional elevation of a paper impregnated in the manner shown in Fig. 4 and having transparent layers different in material from the impregnating medium applied to both sides, Fig. 9 is a diagrammatical elevation partly in section showing impregnating means, Fig. 10, is a detail sectional view on an enlarged scale showing means for passing the film into the vacuum chamber of Fig. 9, Fig. 11, is a detail sectional elevation showing means for passing the web of paper from the vacuum chamber into the pressure chamber of Fig. 9, Fig. 12, is a plan view of a part of Fig. 11.

Fig. 13, is a diagrammatical view showing means for applying thin foils of the film, Fig. 14, is a similar elevation showing a modification of the foil applying means, Fig. 15, is a detail view on an enlarged scale showing a part of Fig. 14, and Fig. 16, is a sectional elevation showing the tapes for holding the film being dried.

In the manufacture of my improved film I make use of a strong glued paper having a fine and uniform texture. The paper ought to be free of any filling media such as kaolin.

The impregnating medium should have an index of refraction as far as possible similar to that of the fibre of the paper. Good results have been obtained when using transparent artificial or natural resins as impregnating media. Suitable artificial resins are for example, first, the products obtained by steam-distillation of a mixture of resinous acid with alcohols such as glycerine or phenol, which products are known in the trade as resinous esters, second, the products, such as light cumarone resin obtained by condensation of tar oils, and, third, the products obtained by condensation of phenols with formaldehyde to which other substances such as urea, may be added, and which are known as formalin-phenol-resins. Good results have been obtained by using Bakelite, 1500 grammes of Bakelite A being dissolved in two liters of alcohol and applied to the paper at a temperature of about 50° C.

Suitable natural resins are for example Manila-copal-balsam and Canada-balsam dissolved in alcohol, turpentine, or hydrocarbons.

To the said substances matter rendering the film soft may be added, the preferred matter being glycerine and other known softening media such as phthalic-acid ester of the higher alcohols, for example Elaol, a product manufactured by the I. G. Farbenindustrie A.-G. The said softening media are preferably used at the rate of from 10 to 20% of the dry impregnating medium.

Further, I may add a suitable hardening medium such as shellac to the impregnating medium, the said shellac being added at the rate of from 3 to 5% of the dry impregnating medium.

Other suitable hardening media are the cellulose-esters which are soluble in alcohol.

When using Bakelite as an impregnating medium hardening takes place as follows: As is known to those skilled in the art, the modification A is soft and soluble in alcohol, the modification B is soft but less soluble in alcohol, while the modification C is hard and insoluble in alcohol. I use the modification A of Bakelite, which by being heated is in part transformed over the modification B into the hard modification C, the said transformation into the modification C taking place, by rapidly heating the matter, mainly on the surface, while in the median parts the modifications A and B are partly maintained so that a flexible film is produced.

In the manufacture of the film I impregnate the paper by passing the same through a bath of one of the aforesaid components or mixtures thereof, and I take care that the film takes off the component in excess and so that an additional surface layer is produced on both sides of the film. Thereafter the film is dried by passing the same about 15 minutes through a heating chamber at a temperature rising from 60 to 105° C. By thus rapidly applying intense heat to the film, the impregnating medium is dried and hardened mainly at the surface, the solvent being evaporated and the softening medium partly remaining within the inner part of the film. Thus a coating is produced, which is impermeable to the softening media within the body of the film, and which therefore prevents the escape of the said softening media. I have found that this result is particularly conspicuous if a hardening agent such as shellac has been added to the impregnating medium, which shellac partly remains in solution within the body of the film and is dried entirely in the surface coating only. Thus a film is obtained which remains flexible for a considerable length of time, and which is comparatively safe as against mechanical injury such as scratches. A similar result is obtained by producing the said surface coatings by applying suitable colloids such as gelatine to the impregnated film, and tanning the same by means of chromic salts or formaldehyde.

Another example of preventing the hardening of the inner part of the film consists in coating the film with a protective layer. For example, a film impregnated with Bakelite containing phenol may be coated at both sides with a thin layer of collodion, which by reason of its humidity repelling character prevents the escape of the phenol. Thus the flexibility of the film caused by the free phenol is maintained.

In Fig. 1 I have shown a paper which has been impregnated so far that the impregnating medium when wet fills out the body of the paper, without however providing a surface layer thereon. By drying the impregnating medium shrinks so far that small pores are produced within the paper, as has been indicated in Fig. 2. Thereby the paper is made dim, and it has only a translucency similar to the tracing paper now in use. In Fig. 3 I have shown a paper impregnated so far that thin surface layers of the impregnating medium are produced on both sides. By drying the shrinking impregnating medium attracts the said surface layer into the body of the paper so that the production of pores is avoided and a transparent paper is produced, as has been shown in Fig. 4. However, the said figure shows that almost the whole mass of the surface layer of impregnating medium has been taken into the body of paper, so that the surfaces of the paper are again irregular. Such paper will be sufficient for many purposes. But when using the same for projection purposes the rays passing through the same are scattered when passing through the irregular surfaces of the paper so that a clear picture cannot be obtained. Fig. 5 shows an impregnated paper before drying to which comparatively thick surface layers have been applied. Therefore, after drying there is still a certain surface layer on both sides of the paper, as has been shown in Fig. 6. The paper which has thus been made is suitable for projection purposes, provided the impregnating medium has the characteristic features referred to above. In Fig. 7 I have shown a film after drying, which is similar to the one shown in Fig. 6, in which however, thin layers of collodion or other matter are applied to both sides, while Fig. 8 shows a film, in which the said foil of collodion has been applied to a film of the form shown in Fig. 4. In this case the index of optical refraction of the collodion or other foil should be the same or substantially the same as that of the impregnating medium and the fibre of the paper.

Various methods may be used for applying the picture to the film. For applying the picture by means of the printing press I proceed as follows: The paper is first made transparent in the manner described above. A film thus produced does not take up the printer's ink, and therefore I apply thereto a coating capable of being printed upon. A suitable coating is for example a dimly drying cellulose-ester-lacquer, which readily takes up printer's ink. After printing a suitable lacquer is applied to the printed surface for again rendering the cellulose-ester transparent. Finally the printed film is coated with a protective layer such as collodion.

In a modification of the method I first print the picture on the paper, thereafter I impregnate the same by means of one of the aforesaid impregnating media, and finally I apply thereto a protective layer such for example as cellophane.

A third example of printing consists in applying an absorbing layer such as the aforesaid cellulose-ester-lacquer to the paper, printing the picture thereon, impregnating the same for example by means of Bakelite, and finally applying a protective layer thereto.

If it is desired to produce the picture on the film by means of a photographic printing process the film is first prepared in the manner described above, and thereafter a sensitized layer is applied thereto.

In the following I shall describe the preferred method of and apparatus for impregnating the paper. I have found that the paper readily imbibes the dissolved impregnating medium when the air has first been largely removed from the paper. Further, I have found that impregnation is accelerated by impregnating under high pressure such as 10 atmospheres, in which case the air may or may not have been removed in vacuo. In the preferred method I first remove the air in vacuo, and thereafter I impregnate the paper under pressure.

In Figs. 9 to 12 I have shown suitable apparatus for preparing the film in the manner described above. As shown the said apparatus consists of a reel 1 having a web 2 of paper rolled thereon, guide rollers 3, a heating drum 4 for drying the paper, a vacuum chamber 5 for removing the air from the pores of the paper, an impregnating chamber 6 for applying the impregnating medium to the web of paper under pressure, a chamber 7 for applying the surface coating to the impregnated web, and drying means including an endless tape 8 trained on rollers 9 and 10.

The vacuum apparatus 5 consists of a receptacle adapted to be closed in an air-tight manner, the web of paper being passed into the same through a passage 11 adapted to be closed in an air-tight manner by means of lamellæ 12 of a suitable flexible material such as rubber, which lamellæ are pressed into contact with the web of paper by the vacuum transmitted to the inner faces thereof through the slot 11. The impregnating chamber 6 is adapted to contain the impregnating medium and is connected with the vacuum chamber 5 by a passage 13 made in a pair of polished steel blocks 14, which slot is closed in an air-tight manner by means of rollers 15 made from soft rubber and making contact with the polished surfaces of the blocks 14. As appears more particularly from Fig. 12, the slot 13 provided between the blocks 14 ends at points away from the end faces of the blocks, so that it is made tight at its ends. Within the chamber 6 there are guide rollers 16 for the web of paper. Suitable means are provided for producing high pressure within the chamber 6. In the illustrated embodiment the said chamber is closed at its bottom by a piston 17 connected with a piston 18 disposed within a pressure cylinder 19 connected with a suitable pressure pump 20. Good results have been obtained by maintaining the impregnating medium within the chamber 6 at a pressure of about 10 atmospheres. The web 2 leaving the pressure chamber 6 is passed through a chamber 7 containing the impregnating medium under atmospheric pressure, the said chamber communicating with the chamber 6 through a slot made tight in the same way as has been described with reference to Figs. 11 and 12. It will be understood that when the web leaves the pressure chamber and passes between the rollers 15 located within the chamber 7 the surface coating is removed therefrom. Therefore the web passes again through an impregnating medium contained in the chamber 7. This second impregnating medium may be of the same or different character as the one applied in the pressure chamber. Scrapers 18a may be provided for removing an excess of impregnating medium from the surface of the web and producing surface layers of uniform thickness.

In Fig. 13 I have shown an apparatus for applying a surface coating of collodion or cellophane to the impregnated web, which apparatus has been shown in part in Fig. 9. As shown the apparatus for applying collodion or cellophane consists of an endless tape 23 made from steel and trained on rollers 24 and passed through a suitable heating chamber 25. To the tape 23 a thin layer of collodion or cellophane is applied from a container 26, which layer is formed into a thin film by being dried within the heating chamber 25. When passing below a roller 27 the film of collodion or cellophane is applied to the impregnated web of paper 2 and both films are passed in contact with each other through a heating chamber 28 in which they are intimately combined. Finally the complete film is rolled on a reel 29. If it is desired to coat the film at both sides, a similar film of collodion or cellophane is produced on a tape 30. The dissolved collodion or cellophane is applied to the said tape from a container 51 and dried within a heating chamber 31. While the film passes over a roller 33, the impregnated web of paper 2 is applied thereto and passed through a heating chamber 34, whereupon the web is passed around the roller 27 where the opposite surface is coated with a film of collodion or cellophane.

In Figs. 14 to 16 I have shown a modification of the apparatus for applying a coating to the impregnated web of paper. As shown the apparatus consists of two endless tapes 38 and 39 trained on rollers 40 and 41 and each formed at both sides with series of blocks 42 of rubber or similar adhesive material, which blocks are adapted to hold the impregnated web of paper 2 between the same, as is shown in Fig. 16. A suitable heating medium is passed between the tapes 38 and 39 and on both sides of the impregnated web 2. Thus the impregnating medium is rapidly dried in the manner described above. At the rear of the tapes 38, 39 there are rollers 44 and 45 and drums 46, 46 for applying films 47, 47 to the top and bottom sides of the impregnated web 2. After the films have thus been applied the web is trained on rollers 48 on which it is exposed to the action of the air. Finally it is rolled on a reel 49.

While in describing the invention reference has been made to particular examples embodying the same I wish it to be understood that my invention is not limited to the composition of the film and the method of manufacturing the same described in the specification.

I claim:

1. The method of producing transparent paper which consists in subjecting the paper to vacuum to extract gases and vapors therefrom, impregnating the paper with a resinous medium under pressure for producing transparency, applying an excess of said medium to both faces of the paper to form a smooth coating on said faces, and forming a hard surface on said coating.

2. The method of producing transparent paper which consists in extracting gases from the paper, impregnating the paper under pressure with a resinous medium containing a hardening agent, applying an excess of said medium to both faces of the paper to form a smooth coating on said faces, and applying heat to said coating to form a hard surface thereon.

3. The method of producing transparent paper which consists in impregnating the paper under pressure with a phenolaldehyde condensation product containing a hardening agent, applying an excess of said product to both faces of the paper to form a smooth coating on said faces, and applying heat to said coating to form a hard surface thereon.

4. The method of producing transparent paper which consists in impregnating the paper with a phenolaldehyde condensation product, applying an excess of said product to both faces of the paper to form a smooth coating thereon, and treating the outer surfaces of the coating to place them in parallelism.

5. The method of producing transparent paper which consists in impregnating the paper under pressure with a phenolaldehyde condensation product containing a hardening agent, applying an excess of said product to both faces of the paper to form a smooth coating on said faces, and rapidly drying the surface of said coating to render said surface hard and impermeable.

6. The method of producing hard-surfaced and flexible transparent paper which consists in impregnating the paper with a solution of a resinous material for producing transparency applying an excess of said solution to both faces of the paper to form a smooth coating on said faces, and rapidly drying the outer surface of said coating to render said surface hard and impermeable.

7. The method of producing transparent paper which consists in impregnating the paper under pressure with a solution of a resinous medium in the presence of a hardening agent, applying an excess of said solution to both faces of the paper to form a smooth coating on said faces, and applying heat to said coating to form a hard surface thereon.

8. The herein-described method of manufacturing transparent paper which consists in subjecting the paper to a vacuum, impregnating the paper with a transparency-producing impregnating medium containing a phenolaldehyde condensation product, applying an excess of material to both faces of said paper to form a smooth coating on said faces, and rapidly drying the surface of said coating to form a hard surface.

9. The method of making transparent paper which consists in impregnating the paper with a resinous medium to produce transparency, supplying an excess of said medium to both sides of the paper, and maintaining said excess throughout the further treatment of the paper, whereby a layer of material remains on the surface of the paper.

10. The method of producing transparent paper which consists in impregnating the paper with a resinous medium under pressure for producing transparency, applying an excess of said medium to both faces of the paper to form a smooth coating on said faces, and forming a hard surface on said coating.

11. The method of producing transparent paper which consists in impregnating the paper under pressure with a resinous medium containing a hardening agent, applying an excess of said medium to both faces of the paper to form a smooth coating on said faces, and applying heat to said coating to form a hard surface thereon.

VIKTOR BAUSCH, Jun.